United States Patent
Lee et al.

(10) Patent No.: US 8,195,162 B2
(45) Date of Patent: Jun. 5, 2012

(54) APPARATUS AND METHOD FOR MANAGING CONNECTION IDENTIFICATION IN A COMMUNICATION SYSTEM

(75) Inventors: Sung-Jin Lee, Seoul (KR); Won-Il Roh, Yongin-si (KR); Jae-Jeong Shim, Seongnam-si (KR); Geun-Hwi Lim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/040,516

(22) Filed: Mar. 4, 2011

(65) Prior Publication Data
US 2011/0159909 A1 Jun. 30, 2011

Related U.S. Application Data

(62) Division of application No. 12/217,990, filed on Jul. 7, 2008.

(51) Int. Cl.
*H04B 7/00* (2006.01)

(52) U.S. Cl. ............ 455/435.1; 455/517; 370/331

(58) Field of Classification Search .......... 455/517, 455/440, 466, 411, 456, 436; 370/328–338, 370/310
See application file for complete search history.

(56) References Cited

U.S. PATENT DOCUMENTS

| | | | |
|---|---|---|---|
| 7,769,399 B2* | 8/2010 | Lee et al. ............ | 455/466 |
| 7,801,078 B2* | 9/2010 | Kim et al. ............ | 370/331 |
| 7,809,355 B2* | 10/2010 | Mohanty et al. ......... | 455/411 |
| 7,961,678 B2* | 6/2011 | Lim et al. ............ | 370/329 |
| 2005/0192011 A1* | 9/2005 | Hong et al. ........... | 455/440 |
| 2005/0265360 A1 | 12/2005 | Kim et al. | |
| 2007/0082621 A1 | 4/2007 | Lee et al. | |
| 2009/0089576 A1* | 4/2009 | Johnston ............. | 713/160 |
| 2009/0092076 A1* | 4/2009 | Zheng et al. ........... | 370/328 |

FOREIGN PATENT DOCUMENTS

JP 2007-110725 4/2007

OTHER PUBLICATIONS

IEEE 802.16/Rev 2 Project; Jungje Son; Samsung; 2008.*
David Johnston, "802.16 CID Number Space Management", Sep. 10, 2003, 9 pages.
Sungjin Lee, et al., "HO Latency Reduction", IEEE 802.16 Broadband Wireless Access Working Group, 7 pages.

* cited by examiner

*Primary Examiner* — Kent Chang
*Assistant Examiner* — Kashif Siddiqui

(57) ABSTRACT

A method and apparatus for transmitting/receiving a connection identification (CID) in a communication system is provided. Upon detecting a need for its handover, a mobile station (MS) transmits a handover request message to a first base station (BS) in communication with the MS. Upon receiving the handover request message, the first BS transmits at least one CID for connection setup to a second BS to which the MS will perform handover, to the MS along with a handover response message in response to the handover request message. The MS receives the CID through the handover response message.

32 Claims, 4 Drawing Sheets

APPARATUS AND METHOD FOR MANAGING CONNECTION IDENTIFICATION IN A COMMUNICATION SYSTEM

CROSS-REFERENCE TO RELATED APPLICATION(S) AND CLAIM OF PRIORITY

The present application is a divisional of co-pending U.S. Non-Provisional patent application Ser. No. 12/217,990, filed Jul. 7, 2008, entitled "APPARATUS AND METHOD FOR MANAGING CONNECTION IDENTIFICATION IN A COMMUNICATION SYSTEM". U.S. Non-Provisional patent application Ser. No. 12/217,990 claims the benefit under 35 U.S.C. §119(a) of a Korean Patent Application filed in the Korean Intellectual Property Office on Jul. 4, 2007 and assigned Serial No. 2007-67009, a Korean Patent Application filed in the Korean Intellectual Property Office on Oct. 5, 2007 and assigned Serial No. 2007-100653, a Korean Patent Application filed in the Korean Intellectual Property Office on Oct. 17, 2007 and assigned Serial No. 2007-104562, and a Korean Patent Application filed in the Korean Intellectual Property Office on Jul. 4, 2008 and assigned Serial No. 2008-64921, the disclosures of which are incorporated herein by reference.

TECHNICAL FIELD OF THE INVENTION

The present invention relates generally to a communication system, and in particular, to an apparatus and method for managing a connection identifier (CID) in a communication system.

BACKGROUND OF THE INVENTION

In the communication system, a mobile station (MS) should have a connection set up to a base station (BS) in order to communicate with the BS. To identify each connection to the BS, the MS is assigned a CID from the BS. The MS, during its initial access to the network of the communication system, is assigned a basic CID and a primary management CID from the BS in order to exchange control data, or control signals, with the BS. In addition, the MS is assigned a transport CID for user data exchange.

That is, the transport CID is assigned to each connection on a one-by-one basis. Therefore, one MS may use a plurality of transport CIDs. Meanwhile, CIDs used in the communication system have, for example, a 16-bit size, and can be classified into various types according to their uses, and uses of the CIDs are shown in Table 1.

TABLE 1

| CID | Value | Description |
| --- | --- | --- |
| Initial Ranging CID | 0x0000 | Used by SS and BS during initial ranging process. |
| Basic CID | 0x0001-m | The same value is assigned to both the DL and UL connections. |
| Primary management | n + 1-2m | The same value is assigned to both the DL and UL connections. |
| Transport CIDs, Secondary Mgt CIDs | 2m + 1-FE9F | For the secondary management connection, the same value is assigned to both the DL and UL connections. |
| Multicast CIDs | 0xFEA0-0xFEFE | For the downlink multicast service, the same value is assigned to all MSs on the same channel that participate in this connection. |

TABLE 1-continued

| CID | Value | Description |
| --- | --- | --- |
| AAS initial ranging CID | 0xFEFF | A BS supporting AAA shall use this CID when allocating an AAS ranging period (using AAS ranging allocation IE). |
| Multicast polling CIDs | 0xFF00-0xFFC9 | A BS may be included in one or more multicast polling groups for the purposes of obtaining bandwidth via polling. These connections have no associated service flow. |
| Normal mode multicast CID | 0xFFFA | Used in DL-MAP to denote bursts for transmission of DL broadcast information to normal mode MS. |
| Sleep mode multicast CID | 0xFFFB | Used in DL-MAP to denote bursts for transmission of DL broadcast information to Sleep mode MS. May also be used in MOB-TRF-IND messages. |
| Idle mode multicast CID | 0xFFFC | Used in DL-MAP to denote bursts for transmission of DL broadcast information to Idle mode MS. May also be used in MOB_PAG-ADV messages. |
| Fragmentable Broadcast CID | 0xFFFD | Used by the BS for transmission of management broadcast information with fragmentation. The fragment sub header shall use 11-bit long FSN on this connection. |
| Padding CID | 0xFFFE | Used for transmission of padding information by SS and BS. |
| Broadcast CID | 0xFFFF | Used for broadcast information that is transmitted on a downlink to all SSs. |

Various types of CIDs used in the communication system are shown in Table 1, and they can be classified into ranging CID, basic CID, primary management CID, transport CID, multicast CID, adaptive antenna system (AAS) initial ranging CID, multicast polling CID, normal mode multicast CID, sleep mode multicast CID, idle mode multicast CID, fragmentable broadcast CID, padding CID and broadcast CID according to their uses.

In addition, the BS can assign basic CID, primary management CID, transport CID, multicast CID and multicast polling CID to each MS. Among the CIDs, the multicast CID and multicast polling CID are assigned in common to a plurality of MSs. However, the basic CID and primary management CID are uniquely assigned to every MS.

The ranging CID is a CID used when an MS accesses a BS and attempts initial ranging.

The basic CID and primary management CID are CIDs that each MS is basically assigned from a BS when it accesses the BS. The multicast polling CID is a CID that predetermined particular MSs use in common. Padding CID is a CID that MSs and BS use in common to indicate 'Padding'. Broadcast CID is a CID that the BS uses to notify MSs that a message including the corresponding CID is a broadcast message.

Generally, the CID assigned from the BS to the MS has a unique value within one BS, and if the MS moves from a service area of the BS to a service area of another BS, the MS should be assigned a new CID from the new BS.

Thereafter, during handover due to the change in the service access point of the MS, the BS and the MS exchange the basic CID and primary management CID with each other, as follows.

FIG. 1 is a signaling diagram illustrating CID transmission/reception in a general communication system. In the case shown herein, an MS is assumed to perform handover.

Referring to FIG. 1, the communication system includes an MS 110, a first BS 120 and a second BS 130. It will be assumed that the first BS 120 is a serving BS which is now providing a communication service to the MS 110, and the second BS 130 is a target BS to which the MS 110 will perform handover.

In step 111, the first BS 120 transmits a downlink channel descriptor (DCD) message to the MS 110. The DCD message is a message broadcasted by the first BS 120.

In step 113, upon receipt of the DCD message, the MS 110 transmits a ranging-request (RNG-REQ) message to the first BS 120. The MS 110 delivers the basic information for a call connection to the first BS 120 through the RNG-REQ message.

In step 115, the first BS 120 transmits a ranging response (RNG-RSP) message to the MS 110 in response to the RNG-REQ message. In this case, the first BS 120 transmits a basic CID to the MS 110 along with the RNG-RSP message to exchange control signals for an initial access. For example, the basic CID is assumed to be '10'. The MS 110 performs synchronization acquisition and transmission power control operations with the first BS 120 by performing the ranging operation of steps 113 through 115.

In step 117, the MS 110 transmits a subscriber station basic capability request (SBC-REQ) message to the first BS 120 for basic capacity negotiation with the first ES 120. The SBC-REQ message includes information on a modulation scheme and/or coding scheme available to the MS 110.

In step 119, the first BS 120 transmits a subscriber station basic capability response (SBC-RSP) message to the MS 110 in response to the SBC-REQ message. In this case, the first BS 120 checks the information on the modulation scheme and/or coding scheme available to the MS 110, included in the SBC-REQ message.

The SBC-REQ message and the SBC-RSP message are a kind of a medium access control (MAC) message that the MS 110 transmits/receives for basic capacity negotiation with the first BS 120.

In step 121, the MS 110 transmits a registration request (REG-REQ) message to the first BS 120. Upon receipt of the REG-REQ message, the first BS 120 detects the MS registration information included in the REG-REQ message, thereby registering the MS 110 with the first BS 120.

In step 123, the first BS 120 transmits to the MS 110 a registration response (REG-RSP) message with the registration information of the MS 110 registered in response to the receipt of the REG-REQ message. In this case, the first BS 120 transmits a primary management CID to the MS 110 along with the RNG-RSP message to exchange control signals for an initial access. For example, the primary management CID is assumed to be '110'.

In step 125, the MS 110 sets up a connection to the first ES 120 using the basic CID (=10) and the primary management CID (=110). The MS 110 can be additionally assigned a transport CID to exchange user data with the first BS 120.

Meanwhile, upon detecting the need for handover, the MS 110 transmits in step 127 a handover request (HO-REQ) message to the first BS 120. In step 129, the first BS 120 transmits a handover response (HO-RSP) message to the first BS 120 in response to the HO-REQ message. The HO-RSP message includes therein information on a target BS (e.g., second BS 130) to which the MS 110 will perform handover. The MS 110 determines if it will perform handover to the second ES 130 based on the information included in the HO-RSP message. If the MS 110 determines to perform handover to the second BS 130, the MS 110 transmits in step 131 to the first BS 120 a handover indication (HO-IND) message indicating that it will soon perform handover to the second BS 130, and then transmits in step 133 an RNG-REQ message to the handover target BS (i.e., second BS 130).

In step 135, the second BS 130 transmits an RNG-RSP message to the MS 110 in response to the RNG-REQ message. The RNG-RSP message includes a basic CID and a primary management CID for updating a CID of the MS 110. The second BS 130 can exchange its control data, or control signals, through the basic CID and primary management CID that it has assigned to the MS 110 and updated. For example, the basic CID is assumed to be '0', and the primary management CID is assumed to be '430'. After receiving the RNG-RSP message from the second BS 130, the MS 110 performs a CID update (basic CID and primary management CID) using the CIDs included in the RNG-RSP message. Thereafter, in step 137, a connection is set up between the MS 110 and the second BS 130.

After performing the CID update, the MS 110 exchanges control data, or control signals, with the second BS 130, and can later perform user data transmission/reception through assignment of transport CID.

As described above, the CID is a value that each BS assigns to an MS that presently communicates with the corresponding BS, and when the MS switches from its current BS to a new BS, it should be assigned a new CID from the new BS.

In other words, the MS that performs handover or resumes its communication, is assigned a CID(s) from the target BS or its new BS, and then updates its CID, so it can perform data transmission/reception. Generally, however, the time required when the MS updates its CID(s) is, for example, 50 ms-100 ms.

As stated above, the MS intending to perform handover or to communicate with a new BS, must acquire the newly assigned CIDs, and the CID acquisition causes a time delay.

SUMMARY OF THE INVENTION

To address the above-discussed deficiencies of the prior art, it is a primary aspect of the present invention is to provide a CID management apparatus and method by which an MS and a BS are both free from time delay in a communication system.

Another aspect of the present invention is to provide a method and apparatus for managing corresponding CIDs using the values predetermined between an MS and a BS without a procedure for directly exchanging CIDs in a communication system.

According to one aspect of the present invention, there is provided a method for managing a connection identification (CID) by a first base station (BS) in a communication system. The CID management method includes broadcasting a first set value and a second set value; upon detecting a need for assigning a basic CID to a mobile station (MS), assigning a basic CID to the MS and transmitting the basic CID to the MS; and assigning a primary management CID of the MS by adding the first set value to the basic CID.

According to another aspect of the present invention, there is provided a method for managing a connection identification (CID) by a mobile station (MS) in a communication system. The CID management method includes receiving a first set value and a second set value broadcasted from a first base station (BS); transmitting a basic CID assignment request to the first BS, and receiving a basic CID assigned from the first BS; and acquiring a primary management CID of the MS by adding the first set value to the basic CID.

According to further another aspect of the present invention, there is provided an apparatus for managing a connection identification (CID) in a communication system. The CID management apparatus includes a first base station (BS) including a transmitter for broadcasting a first set value and a second set value; and a CID assigner for, upon detecting a need for assigning a basic CID to a mobile station (MS), assigning a basic CID to the MS, delivering the basic CID to the transmitter, and assigning a primary management CID of the MS by adding the first set value to the basic CID.

According to yet another aspect of the present invention, there is provided an apparatus for managing a connection identification (CID) in a communication system. The CID management apparatus includes a mobile station (MS) including a receiver for receiving a basic CID, a first set value, and a second set value from a first base station (BS); a transmitter for transmitting a basic CID assignment request to the first BS; and a CID calculator for receiving a basic CID assigned from the first BS, delivered from the receiver, and acquiring a primary management CID of the MS by adding the first set value to the basic CID.

According to still another aspect of the present invention, there is provided a method for transmitting a connection identification (CID) by a serving base station (BS) in a communication system. The CID transmission method includes receiving a handover request message from a mobile station (MS); and transmitting a handover response message to the MS in response to the handover request message. The handover response message includes k first CIDs for connection setup between the MS and k target BSs to which the MS will perform handover, and an offset with which the MS acquires k second CIDs using the k first CIDs, wherein k is an integer greater than 1.

According to still another aspect of the present invention, there is provided a method for receiving a Connection Identification (CID) by a mobile station (MS) in a communication system. The CID reception method includes, upon detecting a need for handover, transmitting a handover request message to a serving base station (BS) in communication with the MS; receiving a handover response message from the serving BS in response to the handover request message; and acquiring k second CIDs using k first CIDs and an offset included in the handover response message. The k first CIDs are CIDs for connection setup to at least k target BSs to which the MS will perform handover, and the offset is a value used for acquiring the k second CIDs using the k first CIDs, wherein k is an integer greater than 1.

According to still another aspect of the present invention, there is provided an apparatus for transmitting a connection identification (CID) in a communication system. The CID transmission apparatus includes a serving base station (BS) for receiving a handover request message from a mobile station (MS), and transmitting a handover response message to the MS in response to the handover request message. The handover response message includes k first CIDs for connection setup between the MS and k target BSs to which the MS will perform handover, and an offset with which the MS acquires k second CIDs using the k first CIDs, wherein k is an integer greater than 1.

According to still another aspect of the present invention, there is provided an apparatus for receiving a connection identification (CID) in a communication system. The CID reception apparatus includes a mobile station (MS) for, upon detecting a need for handover, transmitting a handover request message to a serving base station (BS) in communication with the MS, and receiving a handover response message from the serving BS in response to the handover request message. The handover response message includes therein k first CIDs for connection setup to k target BSs to which the MS will perform handover, and an offset with which the MS acquires k second CIDs using the k first CIDs, wherein k is an integer greater than 1.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention provides a method and apparatus for managing corresponding connection identifiers (CIDs) without a procedure in which an MS and a BS directly exchange CIDs in the communication system.

A first embodiment of the present invention provides a method for assigning and managing CID(s), especially a basic CID and a primary management CID in a communication system. Specifically, the first embodiment provides a method in which an MS acquires a CID when it intends to perform handover to a target BS.

Figure 1:
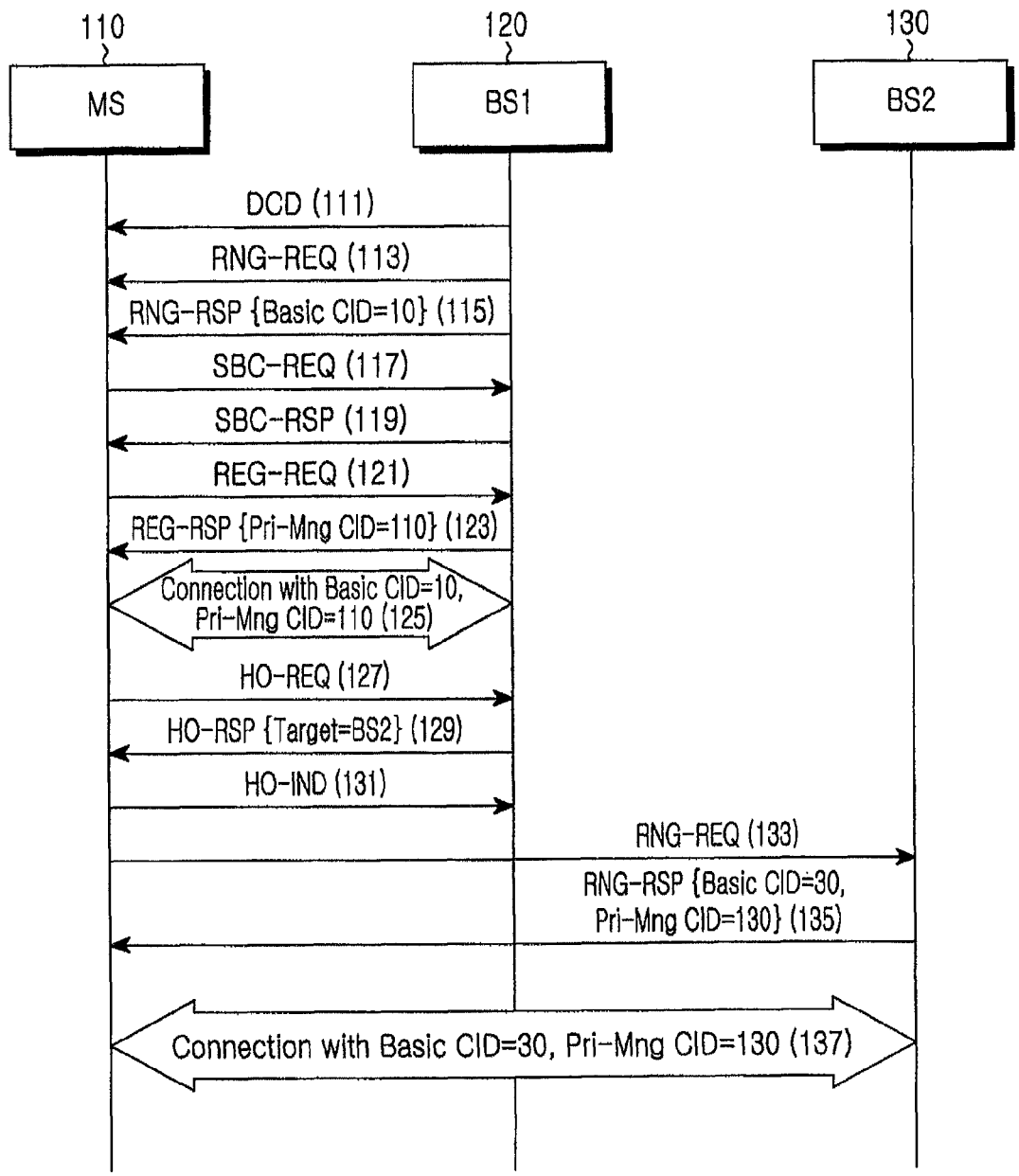
FIG. 1 is a signaling diagram illustrating CID transmission/reception in a general communication system. In the case shown herein, an MS is assumed to perform handover.
Figure 2:
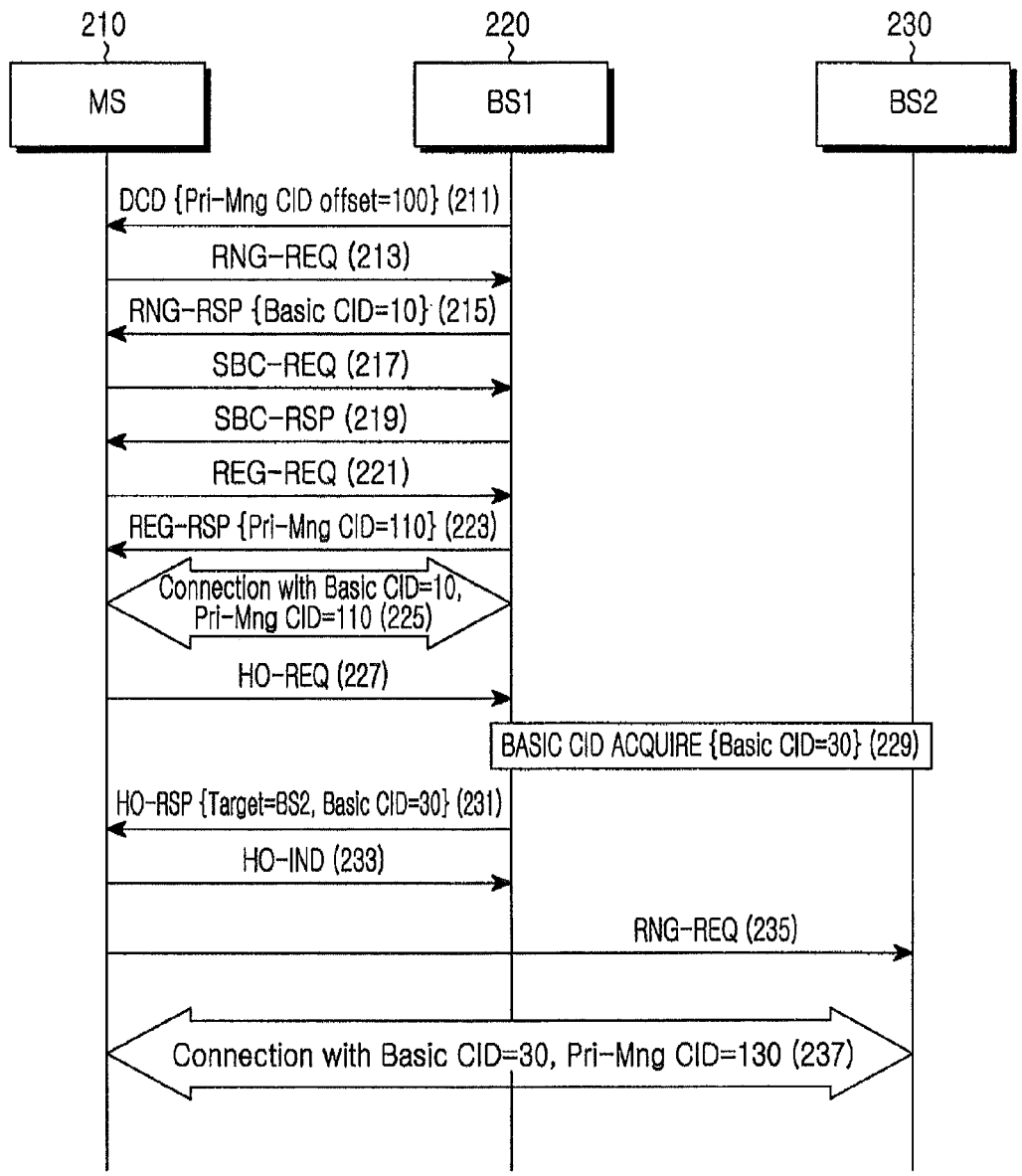
FIG. 2 is a signaling diagram illustrating CID transmission/reception in a communication system according to a first embodiment of the present invention.

FIG. 2 is a signaling diagram illustrating CID transmission/reception in a communication system according to a first embodiment of the present invention.

Referring to FIG. 2, the communication system includes an MS 210, a first BS 220 and a second BS 230. It will be assumed that the first BS 220 is a serving BS which is now providing a communication service to the MS 210, and the second ES 230 is a target BS to which the MS 210 will perform handover.

In step 211, the first BS 220 transmits a downlink channel descriptor (DCD) message to the MS 110. The DCD message is a message broadcasted by the first BS 220. In the present invention, when the first BS 220 assigns only the basic CID to the MS 210, the DCD message includes therein an offset value used for acquiring a primary management CID value. That is, upon receipt of the basic CID value, the MS 210 can acquire a primary management CID without receiving a separate primary management CID by applying the offset value to the basic CID value.

Similarly, when the first BS 220 assigns only the primary management CID to the MS 210, its DCD message includes therein an offset value used for acquiring a basic CID value. That is, upon receipt of the primary management CID value, the MS 210 can acquire a basic CID without receiving a separate basic CID by applying the offset value to the primary management CID value.

Equation 1 shows an example of acquiring a primary management CID by adding an offset to a basic CID value, and acquiring a basic CID by adding an offset to a primary management CID value.

$$\text{Primary Management CID} = \text{Basic CID} + \text{Primary Management CID Offset}.$$

$$\text{Basic CID} = \text{Primary Management CID} + \text{Basic CID Offset}. \qquad [\text{Eqn. 1}]$$

If the first BS 220 assigns both the basic CID and the primary management CID to the MS 210, the offset value is not transmitted.

It will be assumed in FIG. 2 that the first BS 220 transmits the basic CID value to the MS 210, and acquires a primary management CID value by applying an offset value to the basic CID value. In this case, the DCD message of step 211 includes therein an offset value used for acquiring the primary management CID, and the offset value is assumed to be '100'. Of course, the applied offset value is subject to change according to the system environment and/or user setting.

MSs, receiving the DCD message from the first BS 220, can acquire a primary management CID only with receipt of a basic CID, by acquiring an offset value included in the broadcasted DCD message. Regarding the offset value, since the same value is set for each BS, the first BS 220 and the second ES 230 have the same offset value.

In step 213, upon receipt of the DCD message, the MS 210 transmits a ranging-request (RNG-REQ) message to the first BS 220. The MS 110 delivers basic information for a call connection to the first BS 220 through the RNG-REQ message.

In step 215, the first BS 220 transmits a ranging response (RNG-RSP) message to the MS 210 in response to the RNG-REQ message. In this case, the first BS 220 transmits a basic CID for transmission/reception of control signals for an initial access to the MS 210 along with the RNG-RSP message. For example, the basic CID is assumed to be '10'. The MS 210 performs synchronization acquisition and transmission power control operations with the first BS 220 by performing the ranging operation of steps 213 through 215.

In step 217, the MS 210 transmits a subscriber station basic request (SBC-REQ) message to the first ES 220 for basic capacity negotiation with the first BS 220. The SBC-REQ message includes information on the modulation scheme and/or coding scheme available to the MS 210.

In step 219, the first BS 220 transmits a subscriber station basic capability response (SBC-RSP) message to the MS 210 in response to the SBC-REQ message. In this case, the first BS 220 checks information on the modulation scheme and/or coding scheme available to the MS 210, included in the SEC-REQ message.

The SBC-REQ message and the SBC-RSP message are a kind of medium access control (MAC) message that the MS 210 transmits/receives for basic capacity negotiation with the first BS 220.

Although not shown in FIG. 2, the MS 210 can perform an operating procedure for transmitting a privacy key management request (PKM-REQ) message for authentication key exchange after performing the basic capacity negotiation procedure with the first BS 220, and for receiving a privacy key management response (PKM-RSP) message in response to the PKM-REQ message. The PKM-REQ message and the PKM-RSP message are MAC messages, and the PKM-REQ message includes unique information (or a certificate) of the MS 210. The first BS 220 acquires unique information of the MS 210 from the received PKM-REQ message, and performs authentication with an authentication server (AS; not shown) using the unique information. The first BS 220 performs authentication on the MS 210 through the PKM-REQ message, and when the MS 210 is an authenticated MS, receives the PKM-RSP message. The PKM-RSP message includes therein an authentication key (AK) and a traffic encryption key (TEK) assigned to the MS 210.

After performing the basic capacity negotiation procedure, the MS 210 transmits a registration request (REG-REQ) message to the first BS 220 in step 221. Upon receipt of the REG-REQ message, the first BS 220 detects registration information of the MS 210, included in the REG-REQ message, thereby registering the MS 210 with the first BS 220.

In step 223, the first BS 220 transmits a registration response (REG-RSP) message with the registration information of the MS 210 registered in response to the receipt of the REG-REQ message. In this case, the first BS 220 transmits a primary management CID to the MS 210 along with the RNG-RSP message to transmit/receive control signals for an initial access. For instance, the primary management CID is assumed to be '110'.

When an offset value is included in the DCD message, the MS 210 can acquire a basic CID by applying the offset value to the primary management CID value, even though the basic CID value is not transmitted along with the REG-RSP message.

The MS 210, even when it receives the offset value, can be assigned the basic CID value from the first BS 220.

In step 225, the MS 210, which was assigned both the basic CID and the primary management CID, sets up a connection to the first BS 220 using the basic CID (=10) and the primary management CID (=110). The MS 210 can be additionally assigned a transport CID to exchange user data with the first BS 220. Since the assignment of the transport CID departs from the scope of the present invention, a detailed description thereof will be omitted herein.

When the MS 210 detects a need for its handover, the MS 210 transmits a handover request (HO-REQ) message to the first BS 220 in step 227. The MS 210 can determine the need for its handover using signal strength, signal-to-noise ratio (SNR), and signal-to-interference and noise ratio (SINR) of BSs.

In step 229, the first BS 220 acquires a basic CID to be used in the target BS (i.e., second BS 230) to which the MS 210 will perform handover, by exchanging backbone messages with the second BS 230. That is, the first BS 220 can receive from the second BS 230 the basic CID of the MS 210 scheduled to perform handover. For example, the basic CID received through the backbone message is assumed to be '30'.

In step 231, upon acquiring the basic CID, the first BS 220 transmits a handover response (HO-RSP) message to the MS 210 in response to the HO-REQ message. The HO-RSP message includes therein information on the second BS 230 to which the MS 210 will perform handover. In this case, the first BS 220 includes at least one of the basic CID and the primary management CID in the HO-RSP message, and transmits it to the MS 210. For example, it is assumed that basic CID '30' is included in the HO-RSP message. When information on more than two candidate BSs available as a handover target BS is included in the HO-RSP message, the basic CID or primary management CID that the corresponding MS will use in the candidate BSs are included therein.

For example, the first BS 220 is assumed to receive the basic CID. In this case, if the number of candidate BSs is, for example, 3, since the MS 210 needs separate basic CIDs for the candidate BSs, 3 basic CIDs assigned from the candidate BSs are included in the HO-RSP message.

Table 2 shows an example of basic CID pre-assignment (pre-allocation) information included in the HO-RSP message to assign the basic CIDs.

TABLE 2

| Name | Type (1 byte) | Length (1 byte) | Value ((2 × Num of Basic CIDs) bytes) | Scope |
|---|---|---|---|---|
| Basic CID pre-allocation | NNN | 2 × Num of Basic CIDs | List of Basic CIDs (1 per BS) to be used in candidate BSs listed in HO-RSP message. | HO-RSP |

In Table 2, the basic CID assignment information is inserted into the HO-RSP message in the form of type-length-value (TLV), and a basic CID list for each candidate BS is included in the value field.

Regarding the basic CID pre-assignment information, the first BS 220 can transmit it to the MS 210 in the form of a separate message.

Upon receipt of the HO-RSP message, the MS 210 determines in step 233 whether to perform handover to the second BS 230 based on the information included in the HO-RSP message. The MS 210, when it determines to perform handover to the second BS 230, transmits to the first BS 220 a handover indication (HO-IND) message indicating that it will soon perform handover to the second BS 230. Upon its decision to handover to the second BS 230, the MS 210 acquires a primary management CID value (130=30+100) using the basic CID value (=30) of the second BS 230, included in the HO-RSP message, and the primary management CID offset value (=100) included in the DCD message, and perform CID update with the basic CID '30' and the primary management CID '130'.

Although the serving BS of the MS 210 (i.e., the first BS 220) determines the second ES 230 to which the MS 210 will perform handover, herein by way of example, the MS 210 can also determine the second BS 230 to which it will perform handover. When the MS 210 determines the second BS 230 as a BS to which it will perform handover, the MS 210 determines the second BS 230 as a handover target BS, includes the information on the determined second BS 230 in the HO-REQ message, and transmits it to the first BS 220.

After transmitting the HO-IND message to the first BS 220, the MS 210 transmits in step 235 an RNG-REQ message to the handover target BS (i.e., second BS 230).

In step 237, the MS 210 sets up a connection to the second BS 230 using the updated basic CID and primary management CID of the second BS 230. The second BS 230 can exchange its control data, or its control signals, through the connection setup. For example, basic CID is '15' and primary management CID is '130'. After updating the basic CID and primary management CID, the MS 210 exchanges the control data, or control signals, with the second BS 230, and can later exchange its user data through assignment of the transport CID. Since the transport CID assignment departs from the scope of the present invention, a detailed description thereof will be omitted herein.

When the MS does not access a new BS, both the MS and the BS that has assigned the basic CID and primary management CID release assignment of the basic CID and primary management CID, which were assigned previously. To this end, the BS and each MS share therein a timer value for automatic release of the basic CID and primary management CID assignment, and Table 3 shows the timer.

TABLE 3

| Name | Value (msec) | min | max | Scope |
|---|---|---|---|---|
| Pre-allocated CID Release Timer | Basic CID and primary management CID that target BS has previously assigned for MS by HO-RSP message during handover, are released after a lapse of a predetermined time when MS does not access corresponding target BS. | 40 msec | 100 msec | BS, MS |

Table 3 shows a timer value for releasing the pre-assigned CID. The timer is shared between the BS and the MS, and the minimum value 'min' and the maximum value 'max' of the timer value are set to, for example, 40 msec and 100 msec, respectively. Therefore, the BS and the MS of the communication system according to the present invention can each include therein a timer in which the above-stated time values are set.

As described above, when handover occurs, the MS previously performs the assignment procedure for the basic CID and primary management CID in the old serving BS before the handover. Therefore, when the handover actually occurs, it is possible to minimize the data transmission delay time even without the assignment of the basic CID and primary management CID from the handover target BS. In addition, during handover, the present invention acquires the primary management CID by receiving only the basic CID, or acquires the basic CID by receiving only the primary management CID, contributing to a reduction in data transmission/reception overhead compared with the conventional method in which the MS is assigned both the basic CID and the primary management CID.

Next, a second embodiment of the present invention provides a method in which an MS and a BS assign and manage a primary management CID and a transport CID using a basic CID.

First, the MS and BS each acquire a primary management CID using a primary management CID set value (i.e., set value for the primary management CID) and a basic CID. In this case, regarding the basic CID, the MS is assigned the basic CID by the BS with which it currently communicates. For example, the MS transmits a RNG-REQ message to the BS to request assignment of the basic CID, and receives from the BS the basic CID assigned through a RNG-RSP message responsive to the RNG-REQ message.

The primary management CID set value, which is a value predetermined for each BS, uses 'm' included in Table 1. The MS can receive the primary management CID set value from the BS through, for example, DCD message, RNG-RSP message, or neighbor-advertisement (MOB_NBR-ADV) message. In this case, the primary management CID set value can be the same value or a different value for each BS.

Specifically, the MS and the BS each acquire a primary management CID using the basic CID and the primary management CID set value as shown in Equation 2.

$$\text{Primary Management CID} = \text{Basic CID} + m. \quad [\text{Eqn. 2}]$$

That is, as shown in Equation 2, the primary management CID is acquired by adding the primary management CID set value to the basic CID.

Finally, a third embodiment of the present invention provides a scheme in which an MS and a BS each acquire a transport CID using the basic CID and a predetermined transport CID set value. For example, the transport CID set value is assumed to be 'a'. The transport CID set value is a value predetermined for each BS. The MS receives the transport CID set value from the BS through, for example, the DCD message, the RNG-RSP message or the MOB_NBR-ADV message. Alternatively, the transport CID set value either be the same value or a different value for each BS.

Specifically, the MS and the BS each acquire a transport CID assignment range using the basic CID and the transport CID set value as shown in Equation 3.

Transport CID range=from {(2$m$+1)+(Basic CID−1)×$a$} to

{2$m$+Basic CID×$a$}. [Eqn. 3]

where 'm' denotes an offset value, and 'a' denotes a transport CID set value (i.e., the number of transport CIDs that the first BS has reserved to be contiguously assigned to MSs). Herein, 'a' is a value that each BS can arbitrarily set. The transport CID is assigned for the transport connection on a one-by-one basis. The 'm' and 'a' are information that should be transmitted from the BS to the MS. Therefore, the BS that assigned the basic CID, and the MS which is assigned the basic CID, each can acquire the primary management CID and available transport CID assignment range by receiving the 'm' and 'a'.

For example, it is assumed that the transport CID that the MS was assigned from the old BS is 5. The BS and MS each sequentially determine orders of the transport CIDs according to their size. Specifically, the MS acquires the first transport CID by using {(2m+1)+(Basic CID−1)×a} within the transport CID range acquired through Equation 2. Thereafter, the MS sequentially acquires a transport CID for each connection according to the predetermined order beginning from the first transport CID within the transport CID range acquired through Equation 2.

When secondary management CID in the acquired transport CID range are additionally assigned, the foremost CID (i.e., the CID with the smallest number in the acquired transport CID range) is reserved to be preferentially used as the secondary management CID, and the other CIDs can be used as the transport CIDs beginning from the second CID. On the contrary, the CID with the largest number is reserved to be preferentially used as the secondary management CID, and the other CIDs can be used as the transport CIDs beginning from the second largest CID.

Using this method, the BS and MS each can acquire the primary management CID and the transport CID even without the message transmission/reception procedure based on the transport CID assignment. For the transport CID, it is possible to sort the transport CIDs in ascending order or descending order, and to sequentially assign the sorted transport CIDs as new CIDs within the transport CID range.

Figure 3:
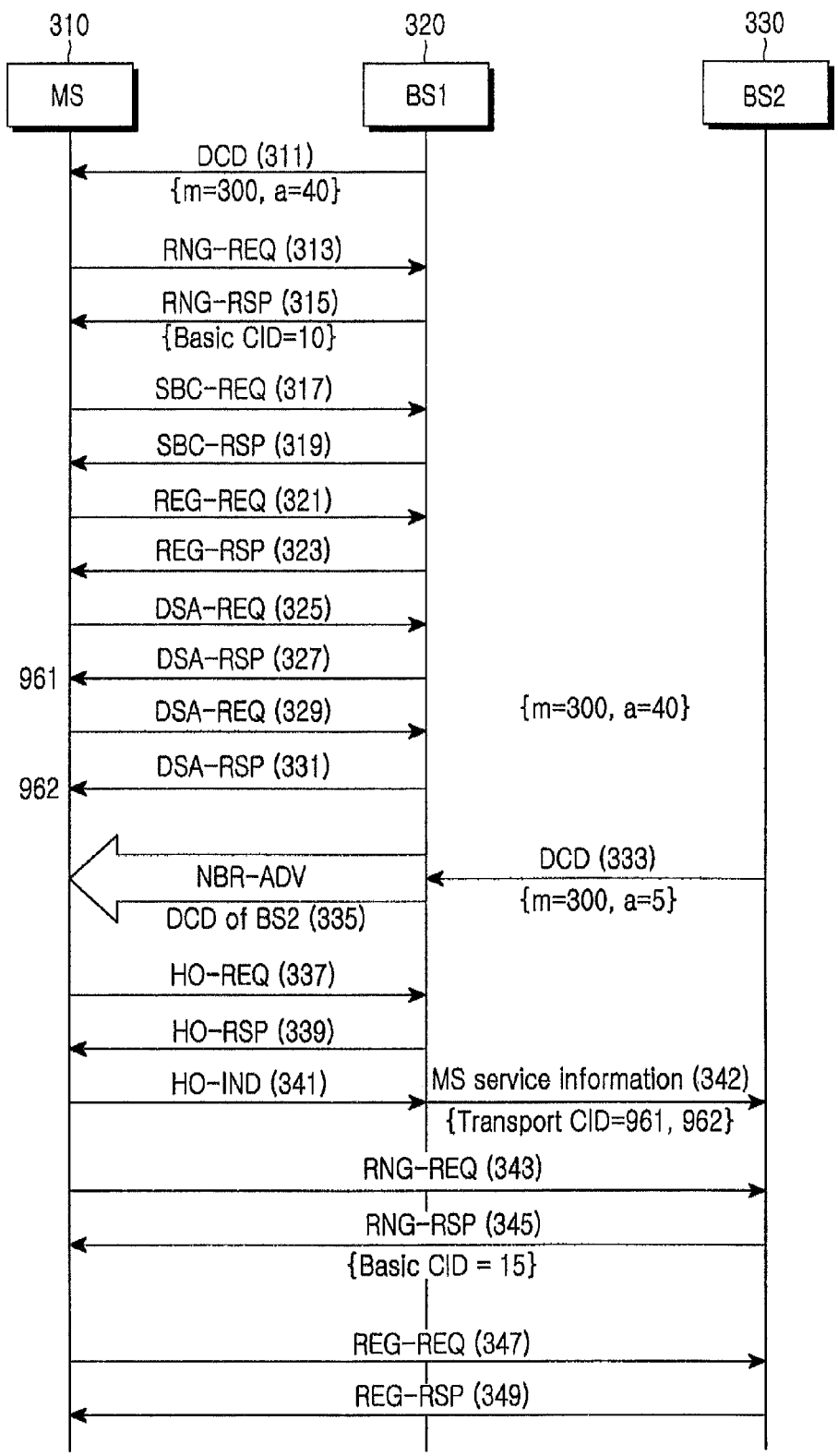
FIG. 3 is a signaling diagram illustrating a CID management operation in a communication system according to a second embodiment of the present invention.

FIG. 3 is a signaling diagram illustrating a CID management operation in a communication system according to a second embodiment of the present invention. In the following description given herein by way of example, the secondary management CID in the transport CID range is additionally assigned.

Referring to FIG. 3, the communication system includes an MS 310, a first BS 320, and a second BS 330. It is assumed that the first ES 320 is a serving ES which is now providing a communication service to the MS 310, and the second BS 330 is a target BS to which the MS 310 will perform handover.

In step 311, the first BS 320 transmits a first DCD message to the MS 310. The first DCD message is a broadcast message broadcasted by the first BS 320. The first DCD message includes a primary management CID set value 'm' and a transport CID set value 'a'. The MS 310 acquires a primary management CID and a transport CID assignment range using the 'm' and the 'a' according to Equation 2 and Equation 3, respectively. In this case, the 'm' is assumed to be '300', and the 'a' is assumed to be '40'.

In step 313, upon receipt of the first DCD message, the MS 310 transmits to the first BS 320 a first RNG-REQ message including basic information for a call connection.

In step 315, the first BS 320 transmits a first RNG-RSP message to the MS 310 in response to the first RNG-REQ message. The first RNG-REQ message includes a basic CID that the first BS 320 assigned to the MS 310, and for example, the basic CID is assumed to be '10'.

That is, the first BS 320 acquires a primary management CID using the 'm' while assigning a basic CID to the MS 310, and upon receiving the basic CID from the first BS 320, the MS 310 also acquires a primary management CID using the 'm'. Specifically, the first BS 320 and the MS 310 each acquire the primary management CID '310' (10 (Basic CID)+300 (m)) according to Equation 2.

The MS 310 and the first BS 320, once they acquire the primary management CID, can mutually exchange control signals for an initial access. In this case, the basic CID that the MS 310 and the first BS 320 have acquired is '10', and the primary management CID is '310'.

In steps 313 through 315, the MS 310 performs a ranging operation (i.e., synchronization acquisition and transmission power control operations) with the first BS 320. After acquiring the basic CID and the primary management CID through the above-stated procedure, the MS 310 sets up a connection to the first BS 320 using the basic CID (=10) and primary management CID (=310).

In step 317, the MS 310 transmits an SBC-REQ message to the first BS 320 for basic capacity negotiation between the first BS 320 and the MS 310. For example, the SBC-REQ message includes information on the modulation scheme and/or coding scheme available to the MS 310.

In step 319, upon receiving the SBC-REQ message from the MS 310, the first BS 320 transmits an SBC-RSP message to the MS 310 in response to the SBC-REQ message. The SBC-REQ message includes information on the modulation scheme and/or coding scheme available to the MS 310. The SBC-REQ message and the SBC-RSP message are a kind of MAC message that the MS 310 transmits/receives for basic capacity negotiation with the first BS 320.

In step 321, the MS 310 transmits a first REG-REQ message including its registration information to the first BS 320. Upon receipt of the first REG-REQ message, the first BS 320 detects the MS registration information and registers the MS 310 in the first BS 320.

In step 323, upon receipt of the first REG-REQ message, the first BS 320 transmits a first REG-RSP message to the MS 310. The first REG-RSP message includes registration information of the registered MS.

In step 325, the MS 310 transmits a first dynamic service addition request (DSA-REQ) message to the first BS 320. In step 327, upon receipt of the first DSA-REQ message, the first BS 320 transmits a first dynamic service addition response (DSA-RSP) message to the MS 310. In this case, the first BS 320 and the MS 310 each acquire a first transport CID to be assigned to the MS 310, according to Equation 3. That is, if m=300 and a=40 acquired in step 311 are applied to Equation 3, it is possible to acquire the transport CID assignment range from '961 ((2*300 (m)+1)+(10 (Basic CID)−1)*40(a))' to '1000 ((2*300 (m))+10 (Basic CID)*40(a))'. The MS 310 and the second BS 330 each acquire the transport CID assignment range '961-1000', and assigns a CID with the smallest number '961' in the transport CID range as the first transport CID.

In step 329, the MS 310 transmits a second DSA-REQ message to the first BS 320. The second DSA-REQ message includes information for user data transmission/reception, i.e., information for requesting a transport CID, and this transport CID request is a transport CID request for transmission of a different service connection from that of step 325.

In step 331, upon receipt of the second DSA-REQ message, the first BS 320 transmits a second DSA-RSP message to the MS 310. In this case, the first BS 320 and the MS 310 each assign the next value 962 of the first transport CID 961 in the transport CID range acquired in step 327, as a second transport CID.

The DSA-REQ message and DSA-RSP message are messages exchanged between the BS and the MS 310 when the MS 310 sets up a new service connection to the BS.

In step 333, the second BS 330 transmits a second DCD message to the MSs in a cell (s) of the second BS 330, or to a neighbor BS (e.g., the first BS 320). The second DCD message is a broadcast message broadcasted by the second BS 330, and it includes a primary management CID set value 'm' and a transport CID set value 'a' like the first DCD message. The MS 310 can acquire a primary management CID and a transport CID assignment range, using the 'm' and 'a' included in the second DCD message. In this case, the 'm' is assumed to be '300', and the 'a' is assumed to be '5'.

Although the above-described second DCD message is given herein as an example for transmitting/receiving the 'm' and the 'a', the second BS 330 can generate a different message or a separate message and transmit it to the first BS 320 or the MS 310.

In step 335, upon receipt of the second DCD message, the first BS 320 transmits a MOB_NBR-ADV message with the second DCD message to the MS 310. The MOB_NBR-ADV message, though it includes, for example, the second DCD message, can further include DCD messages from BSs other than the second BS 330.

In step 337, upon detecting its need for handover, the MS 310 transmits an HO-REQ message to the first BS 320.

In step 339, upon receipt of the HO-REQ message, the first BS 320 transmits an HO-RSP message to the MS 310 in response to the HO-REQ message. The HO-RSP message includes information on the target BS (e.g., second BS 330) to which the MS 310 will perform handover.

Upon receipt of the HO-RSP message, the MS 310 determines if it will perform handover to the second BS 330 based on the information included in the HO-RSP message. If the MS 310 decides to perform handover to the second BS 330, it transmits in step 341 to the first BS 320 an HO-IND message indicating that it will soon perform handover to the second BS 330. The HO-IND message can further include transport CIDs, e.g., '961' and '962', that the MS 310 uses with the first BS 320.

Upon receiving the HO-IND message in step 341, the first BS 320 transmits an MS service information message to the second BS 330 in step 342. The MS service information message includes transport CIDs, e.g., '961' and '962', used by the MS 310. Also, the MS 310 can include the MS service information message in a RNG-REQ message and transmit it to the second ES 330.

After transmitting the HO-IND message to the first BS 320, the MS 310 transmits in step 343 a second RNG-REQ message to the handover target BS (i.e., second BS 330). The second RNG-REQ message includes basic information for a call connection.

In step 345, the second BS 330 transmits a second RNG-RSP message to the MS 310 in response to the second RNG-REQ message. The second RNG-REQ message includes the basic CID that the second BS 330 assigned to the MS 310. Herein, the basic CID is assumed to be '15'.

The second BS 330, if it assigns the basic CID to the MS 310, acquires a primary management CID using the 'm' of the second BS 330, acquired through the MOB_NBR-ADV message. Similarly, upon receipt of the basic CID from the BS, the MS 310 also acquires a primary management CID using the 'm'. That is, the second BS 330 and the MS 310 each acquire a primary management CID '315 (15 (Basic CID)+300 (m))' using Equation 2. The MS 310 and the second BS 330, once they acquire the primary management CID, can exchange control signals for an initial access with each other. For example, the basic CID is assumed to be '15', and the primary management CID is assumed to be '315'.

In steps 343 through 345, the MS 310 performs a ranging operation (i.e., synchronization acquisition and transmission power control operations) with the second BS 330. The MS 310, which has been assigned the basic CID and primary management CID, sets up a connection to the second BS 330 using the basic CID (=15) and primary management CID (=315).

As described above, the MS 310 and the second BS 330 can acquire the primary management CID with only the basic CID transmission/reception procedure without performing a separate transmission/reception procedure for the primary management CID. When the 'a' of the second BS 330, acquired through the MOB_NBR-ADV message, is used, the MS 310 and the second BS 330 can calculate a transport CID assignment range necessary for directly selecting a new connection CID to be used in the second BS 330, with which the connection CID which was used in the first BS 320 can be updated. The MS 310 and the second BS 330 each can acquire a transport CID assignment range from '1301 ((2*300 (m)+1)+(15 (Basic CID)−1)*50 (a))' to '1350 ((2*3000 (m))+15 (Basic CID)*50(a)' according to Equation 2 using the 'a'.

The MS 310 and the second BS 330 each can acquire a transport CID assignment range '1301-1350', and reserve the CID with the smallest number '1301' in the transport CID range for secondary management CID assignment for the MS 310. If the '1301' is reserved, the CIDs except for the '1301' are assigned as transport CIDs beginning from the next number '1302'.

Therefore, the first transport CID '961' that the MS 310 was previously using is updated with '1302', and the second transport CID '962' that the MS 310 was previously using is update with '1303'. The MS 310 and the second BS 330 each sequentially assign transport CIDs in the transport CID range in the order of transport CID having a lower value. As a result, the MS 310 and the second BS 330 have no need to exchange transport CIDs for the transport CID update with each other.

In the foregoing description, it is assumed that the second BS 330 uses all transport CIDs with which the MS 310 is in connection with the first BS 320. However, the second BS 330 can reset (i.e., update) only some of the transport CIDs with which the MS 310 is in connection with the first BS 320, using the foregoing method.

The second BS 330 can transmit the following CID update indication information to selectively update transport CIDs of the MS 310, and the CID update indication information is shown in Table 4.

TABLE 4

| Name | Type (1 byte) | Length (byte) | Value | Scope |
| --- | --- | --- | --- | --- |
| CID update indication | XX | Variable | Bitmap | RNG-RSP, REG-RSP |

Referring to Table 4, the type field, which is composed of, for example, 1 byte, uses an arbitrary value for indicating the CID update indication.

The length field is used to indicate a length of the value field, and can be set to an arbitrary value or can have a variable value.

The value field is generated in the bitmap form, and transmitted to the MS 310 by the second BS 330. The value field includes transport CID information for updated transport CIDs and non-updated transport CIDs among the transport CIDs being used by the MS 310, and information on the non-updated transport CIDs is included a bitmap or a rejected transport CID bitmap size indicating transport CIDs which are not accepted by the second BS 330 for the MS 310. For example, when the value included in the value field is assumed to be '11101101', it indicates that among the connection CIDs that the MS 310 was using in the first BS 320, the CIDs using the first, second, third, fifth, sixth and eighth smallest numbers as their transport CID values will be sequentially updated as new CIDs, while the CIDs using the fourth and seventh smallest numbers will not be updated as new CIDs. Although the CID update has been made herein for the CIDs in the smaller transport CID value order, by way of example, the CID update can also be made in the larger transport CID value order.

The CID update indication information can be included in, for example, an RNG-RSP message or an REG-RSP message.

Although the second BS 330 herein inserts the CID update indication information in the form of type-length-value, by way of example, the CID update indication information can be generated in the form of a separate message, and then transmitted to the MS 310.

When the second BS 330 uses the CID update indication information, the CID update indication information can be transmitted in the RNG-RSP message of step 345.

In this manner, the second BS 330 selects the CIDs or transport CIDs that will undergo CID update. When the second BS 330 performs update on the selected transport CIDs, it can, for example, re-sort the selected CIDs and update the transport CIDs within the transport CID range.

Meanwhile, the second BS 330 can release connections for the transport CIDs which did not undergo the transport CID update proposed by the present invention.

The MS 310 includes, for example, in an REG-REQ message, information on the transport CIDs that did not undergo transport CID update reported from the second BS 330, and then transmits the REG-REQ message to the second BS 330. The MS 310 can receive the updated new transport CID information from the second BS 330 through, for example, a REG-RSP message. Therefore, for the transport CIDs unselected by the second BS 330, the MS 310 receives new transport CIDs updated by the second ES 330, and uses them for connection setup to the second BS 330.

In step 347, the MS 310 transmits a second REG-REQ message including its registration information to the second BS 330. Thereafter, upon receipt of second REG-REQ message, the second BS 330 detects the MS registration information and registers the MS 310 with the second BS 330.

In step 349, upon receipt of the second REG-REQ message, the second BS 330 transmits a second REG-RSP message to the MS 310. The second REG-RSP message includes registration information of the registered MS 310.

In this case, the second REG-RSP message has no need to include information for separate transport CID assignment. In addition, the BS and MS acquire the primary management CID and the transport CID by exchanging only the basic CID, thereby enabling connection setup between the BS and the MS for each service connection.

Figure 4:
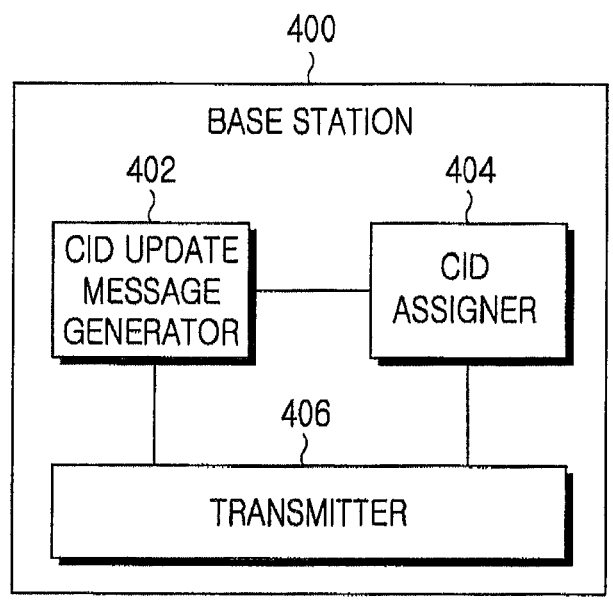
FIG. 4 is a block diagram illustrating a structure of a BS according to an embodiment of the present invention.

FIG. 4 is a block diagram illustrating a structure of a BS according to a preferred embodiment of the present invention.

Referring to FIG. 4, a BS 400 includes a CID update message generator 402, a CID assigner 404 and a transmitter 406.

The CID update message generator 402 generates a CID update message including a bitmap indicating transport CIDs accepted by the BS to an MS and also including a rejected transport CID bitmap size indicating transport CIDs which are not accepted by the BS to the MS, and delivers it to the transmitter 406.

Upon receipt of a connection request from an MS, the CID assigner 404 assigns a basic CID to the MS, and calculates a primary management CID using Equation 2. Further, the CID assigner 404 acquires a transport CID assignment range of the MS using Equation 3, and sequentially assigns a transport CID corresponding to the connection request of the MS.

Thereafter, the transmitter 406 includes the basic CID, the offset value, and the transport CID set value received from the CID assigner 404, in their corresponding messages according to the procedure of FIG. 2, and transmits them to the MS.

Figure 5:
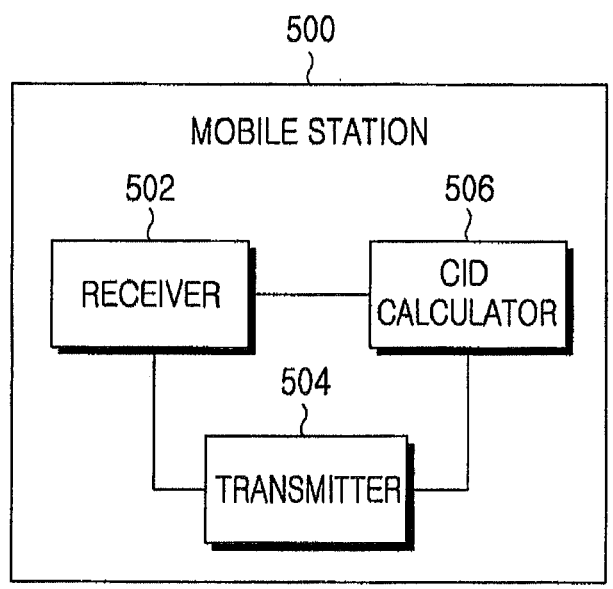
FIG. 5 is a block diagram illustrating a structure of an MS according to an embodiment of the present invention.

FIG. 5 is a block diagram illustrating a structure of an MS according to a preferred embodiment of the present invention.

Referring to FIG. 5, an MS 500 includes a receiver 502, a transmitter 504 and a CID calculator 506.

The receiver 502 receives from a BS the messages corresponding to the procedure of FIG. 2. The received messages each include therein the basic CID, the offset value, and the transport CID set value, and the receiver 502 delivers the values to the CID calculator 506. Then the CID calculator 506 calculates a primary management CID and a transport CID for each connection using the offset value and/or transport CID set value according to Equation 1 through Equation 3. The transmitter 504 transmits a basic CID assignment request to the BS.

As is apparent from the foregoing description, in the communication system according to the present invention, as the MS previously performs the basic CID and the primary management CID assignment procedure in the old serving BS before its handover, the target BS enables data transmission/reception even without performing a separate basic CID and primary management CID assignment at the handover time, contributing to a decrease in the time delay caused by the CID update. In addition, the present invention can acquire both the basic CID and the primary management CID from any one of the basic CID and the primary management CID, contributing to a decrease in the overhead caused by the message exchange.

Further, according to the present invention, each MS can generate a primary management CID and a transport CID range using a transport CID set value in addition to the basic CID and the primary management CID set value. Therefore, the BS and the MS can acquire the primary management CID and the transport CID even with an exchange of only the basic CID, and exchange messages using the acquired CIDs, contributing to a reduction in the load of messages exchanged for the CID assignment. That is, as the MS and BS share the values predetermined therebetween, they can automatically acquire the transport CID with only the basic CID.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for managing connection identifiers (CIDs) of a mobile station in a communication system, the method comprising:
   transmitting a downlink message comprising a first set value and a second set value to the mobile station, wherein the first set value indicates a maximum value among basic connection identifiers being assignable by a base station, and the second set value indicates the number of transport connection identifiers that the base station has reserved for each mobile station;
   determining a range of transport connection identifiers for the mobile station based on a basic connection identifier assigned to the mobile station and the first and second set values; and
   determining at least one transport connection identifier for the mobile station within the determined range.

2. The method of claim 1, wherein the downlink message comprises a Downlink Channel Descriptor (DCD) message.

3. The method of claim 1, wherein a specified one of the transport connection identifiers within the determined range is reserved as a secondary management connection identifier.

4. The method of claim 1, wherein determining the at least one transport connection identifier comprises updating the at least one transport connection identifier of the mobile station in ascending order within the determined range.

5. The method of claim 1, wherein a first transport connection identifier among the transport connection identifiers being assignable to the mobile station is determined by using the following equation:

$$\text{first transport CID} = \{(2m+1) + (\text{Basic CID} - 1) \times a\},$$

where 'm' denotes the first set value, and 'a' denotes the second set value.

6. The method of claim 1, wherein the range of the transport connection identifiers assignable to the mobile station is determined by using the following equation:

$$\text{Transport CID range} = \text{from } \{(2m+1) + (\text{Basic CID} - 1) \times a\} \text{ to } \{2m + \text{Basic CID} \times a\},$$

where 'm' denotes the first set value, and 'a' denotes the second set value.

7. The method of claim 1, further comprising:
   transmitting, to the mobile station, information about at least one transport connection identifier that is not accepted by a base station.

8. The method of claim 7, wherein the information comprises a bitmap indicating at least one transport connection identifier that is not accepted by the base station among transport connection identifiers being assignable to the mobile station.

9. A method for managing connection identifiers (CIDs) of a mobile station in a communication system, the method comprising:
   receiving a downlink message comprising a first set value and a second set value at the mobile station, wherein the first set value indicates a maximum value among basic connection identifiers being assignable by a base station, and the second set value indicates the number of transport connection identifiers that the base station has reserved for each mobile station;
   determining a range of transport connection identifiers for the mobile station based on a basic connection identifier assigned to the mobile station and the first and second set values; and
   determining at least one transport connection identifier for the mobile station within the determined range.

10. The method of claim 9, wherein the downlink message comprises a Downlink Channel Descriptor (DCD) message.

11. The method of claim 9, wherein a specified one of the transport connection identifiers within the determined range is reserved as a secondary management connection identifier.

12. The method of claim 9, wherein determining the at least one transport connection identifier comprises updating the at least one transport connection identifier of the mobile station in ascending order within the determined range.

13. The method of claim 9, wherein a first transport connection identifier among the transport connection identifiers being assignable to the mobile station is determined by using the following equation:

$$\text{first transport CID} = \{(2m+1) + (\text{Basic CID} - 1) \times a\},$$

where 'm' denotes the first set value, and 'a' denotes the second set value.

14. The method of claim 9, wherein the range of the transport connection identifiers assignable to the mobile station is determined by using the following equation:

$$\text{Transport CID range} = \text{from } \{(2m+1) + (\text{Basic CID} - 1) \times a\} \text{ to } \{2m + \text{Basic CID} \times a\},$$

where 'm' denotes the first set value, and 'a' denotes the second set value.

15. The method of claim 9, further comprising:
   receiving, from a base station, information about at least one transport connection identifier which is not accepted by the base station.

16. The method of claim 15, wherein the information comprises a bitmap indicating at least one transport connection identifier that is not accepted by the base station among transport connection identifiers being assignable to the mobile station.

17. An apparatus in a base station for managing connection identifiers (CIDs) of a mobile station in a communication system, the apparatus comprising:
   a transmitter configured to transmit a downlink message including a first set value and a second set value to the mobile station, wherein the first set value indicates a maximum value among basic connection identifiers being assignable by the base station, and the second set value indicates the number of transport connection identifiers that the base station has reserved for each mobile station; and
   a CID assigner configured to determine a range of transport connection identifiers for the mobile station based on a basic connection identifier assigned to the mobile station and the first and second set values and determine at least one transport connection identifier for the mobile station within the determined range.

18. The apparatus of claim 17, wherein the downlink message comprises a Downlink Channel Descriptor (DCD) message.

19. The apparatus of claim 17, wherein a specified one of the transport connection identifiers within the determined range is reserved as a secondary management connection identifier.

20. The apparatus of claim 17, wherein the CID assigner is configured to update the at least one transport connection identifier of the mobile station in ascending order within the determined range.

21. The apparatus of claim 17, wherein a first transport connection identifier among the transport connection identifiers being assignable to the mobile station is determined by using the following equation:

first transport CID=$\{(2m+1)+(\text{Basic CID}-1)\times a\}$, where 'm' denotes the first set value, and 'a' denotes the second set value.

22. The apparatus of claim 17, wherein the range of the transport connection identifiers assignable to the mobile station is determined by using the following equation:

Transport CID range=from $\{(2m+1)+(\text{Basic CID}-1)\times a\}$ to $\{2m+\text{Basic CID}\times a\}$, where 'm' denotes the first set value, and 'a' denotes the second set value.

23. The apparatus of claim 17, wherein the transmitter is configured to transmit, to the mobile station, information about at least one transport connection identifier that is not accepted by the base station.

24. The apparatus of claim 23, wherein the information comprises a bitmap indicating at least one transport connection identifier that is not accepted by the base station among transport connection identifiers being assignable to the mobile station.

25. An apparatus in a mobile station for managing connection identifiers (CDs) of the mobile station in a communication system, the apparatus comprising:
a receiver configured to receive a downlink message including a first set value and a second set value, wherein the first set value indicates a maximum value among basic connection identifiers being assignable by a base station, and the second set value indicates the number of transport connection identifiers that the base station has reserved for each mobile station; and
a CID calculator configured to determine a range of transport connection identifiers for the mobile station based on a basic connection identifier assigned to the mobile station and the first and second set values and determine at least one transport connection identifier for the mobile station within the determined range.

26. The apparatus of claim 25, wherein the downlink message comprises a Downlink Channel Descriptor (DCD) message.

27. The apparatus of claim 25, wherein a specified one of the transport connection identifiers within the determined range is reserved as a secondary management connection identifier.

28. The apparatus of claim 25, wherein the CID calculator is configured to update the at least one transport connection identifier of the mobile station in ascending order within the determined range.

29. The apparatus of claim 25, wherein a first transport connection identifier among the transport connection identifiers being assignable to the mobile station is determined by using the following equation:

first transport CID=$\{(2m+1)+(\text{Basic CID}-1)\times a\}$, where 'm' denotes the first set value, and 'a' denotes the second set value.

30. The apparatus of claim 25, wherein the range of the transport connection identifiers assignable to the mobile station is determined by using the following equation:

Transport CID range=from $\{(2m+1)+(\text{Basic CID}-1)\times a\}$ to $\{2m+\text{Basic CID}\times a\}$, where 'm' denotes the first set value, and 'a' denotes the second set value.

31. The apparatus of claim 25, wherein the receiver is configured to receive, from a base station, information about at least one transport connection identifier that is not accepted by the base station.

32. The apparatus of claim 31, wherein the information comprises a bitmap indicating at least one transport connection identifier that is not accepted by the base station among transport connection identifiers being assignable to the mobile station.

* * * * *